US012249762B2

(12) United States Patent
Zhao et al.

(10) Patent No.: US 12,249,762 B2
(45) Date of Patent: Mar. 11, 2025

(54) GAP WAVEGUIDE ANTENNA STRUCTURE AND ELECTRONIC DEVICE

(71) Applicant: Shenzhen Yinwang Intelligent Technologies Co., Ltd., Shenzhen (CN)

(72) Inventors: Zhidong Zhao, Shenzhen (CN); Qiang Li, Beijing (CN); Dapeng Lao, Beijing (CN); Yong Yang, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 67 days.

(21) Appl. No.: 18/160,181

(22) Filed: Jan. 26, 2023

(65) Prior Publication Data

US 2023/0170622 A1 Jun. 1, 2023

Related U.S. Application Data

(63) Continuation of application No. PCT/CN2020/105549, filed on Jul. 29, 2020.

(51) Int. Cl.
*H01Q 13/20* (2006.01)
*H01Q 9/04* (2006.01)

(52) U.S. Cl.
CPC ......... *H01Q 13/206* (2013.01); *H01Q 9/0407* (2013.01)

(58) Field of Classification Search
CPC ...... H01Q 13/206; H01Q 9/0407; H01Q 1/50; H01Q 1/36; H01Q 1/002; H01P 5/107; H01P 3/18; H01P 3/081
See application file for complete search history.

(56) References Cited

U.S. PATENT DOCUMENTS 10,643,961 B1 * 5/2020 Chieh ..................... H01L 24/48
2017/0084971 A1 * 3/2017 Kildal ................ H01Q 21/0087
(Continued)

FOREIGN PATENT DOCUMENTS

WO 2021016217 A1 1/2021

OTHER PUBLICATIONS

Brazález et al., "Investigation of a Microstrip-to-Ridge Gap Waveguide Transition by Electromagnetic Coupling," Proceedings of the 2012 IEEE International Symposium on Antennas and Propagation, DOI: 10.1109/APS.2012.6349302, total 2 pages, Institute of Electrical and Electronics Engineers, New York, New York (Jul. 2012).
(Continued)

*Primary Examiner* — Raymond R Chai
(74) *Attorney, Agent, or Firm* — Leydig, Voit & Mayer, Ltd.

(57) ABSTRACT

This application provides a gap waveguide antenna structure and an electronic device, and relates to the field of communication radars. The antenna structure includes a top layer, a gap waveguide structure, a microstrip structure, and a bottom layer. The top layer is parallel to the bottom layer. A first metal layer and a second metal layer are laid on two sides of a dielectric layer of the top layer, and the microstrip structure is disposed on the second metal layer. A frame of the microstrip structure is separated from metal of the second metal layer by leaving a space. The foregoing special antenna structure can reduce a transmission loss, improve a coupling capability, and effectively improve transmission efficiency of energy or an electromagnetic wave.

12 Claims, 6 Drawing Sheets

(56) References Cited

U.S. PATENT DOCUMENTS

| | | | | |
|---|---|---|---|---|
| 2018/0269557 | A1* | 9/2018 | Fangfang ................ | H01P 3/121 |
| 2019/0109361 | A1* | 4/2019 | Ichinose ................. | H01P 3/123 |
| 2020/0194862 | A1* | 6/2020 | Kamo ..................... | H01P 5/024 |

OTHER PUBLICATIONS

Brazález et al., "Design of F-Band Transition From Microstrip to Ridge Gap Waveguide Including Monte Carlo Assembly Tolerance Analysis," IEEE Transactions on Microwave Theory and Techniques, vol. 64, No. 4, XP011604828, ISSN: 0018-9480, DOI: 10.1109/TMTT.2016.2535334, total 10 pages, Institute of Electrical and Electronics Engineers, New York, New York (Apr. 2016).

* cited by examiner

Top view after a top layer is removed

GAP WAVEGUIDE ANTENNA STRUCTURE AND ELECTRONIC DEVICE

CROSS-REFERENCE TO RELATED APPLICATIONS

This application is a continuation of International Application No. PCT/CN2020/105549, filed on Jul. 29, 2020, the disclosure of which is hereby incorporated by reference in its entirety.

TECHNICAL FIELD

This application relates to the field of communication radars, and more specifically, to a gap waveguide antenna structure and an electronic device.

BACKGROUND

As high-frequency technologies and millimeter-wave technologies continuously develop, low-loss planar antennas have been well applied. A conventional waveguide slot antenna is a good choice for high-frequency applications. However, generally, a feeding network of a waveguide slot antenna is very complicated, and it is very difficult to ensure processing precision of the waveguide slot antenna. However, compared with the conventional waveguide slot antenna, difficulty of processing and assembly of a gap waveguide structure is greatly reduced, thereby facilitating application of waveguide slot antennas in the millimeter-wave field.

On a millimeter-wave band, a design of integrating an antenna and a monolithic microwave integrated circuit (MMIC)-based active radio frequency circuit is also critical. For a gap waveguide slot antenna, favorable energy transmission between a microstrip and a gap waveguide is a key factor of an overall design. A design of such a transmission structure requires very good impedance matching and a very good integration design. Generally, feeding modes of the transmission structure may include coupling feeding and direct contact feeding.

In a common gap waveguide slot antenna structure, energy is transmitted between a microstrip and a gap waveguide in a coupling feeding mode. The microstrip is directly laid on an upper surface of a printed circuit board (PCB), and is coupled to the gap waveguide. However, because one PCB dielectric layer exists between a top layer of the gap waveguide and a periodic pin structure, the PCB dielectric layer causes great energy losses during energy transmission, thereby reducing energy transmission efficiency.

Therefore, how to increase energy transmission efficiency is a problem to be urgently resolved.

SUMMARY

This application provides a gap waveguide antenna structure and an electronic device, to effectively increase energy transmission efficiency.

According to a first aspect, a gap waveguide structure is provided. The gap waveguide structure includes: a top layer, a gap waveguide structure, a microstrip structure, and a bottom layer. The top layer is parallel to the bottom layer. The top layer includes a first metal layer, a dielectric layer, and a second metal layer. The first metal layer is laid on a first side of the dielectric layer, and the second metal layer is laid on a second side of the dielectric layer. The gap waveguide structure includes a periodic pin structure and a ridge structure, the periodic pin structure and the ridge structure are disposed on a side of the bottom layer close to the top layer, a slot is formed between the periodic pin structure and the second metal layer, and a slot is formed between the ridge structure and the second metal layer. The periodic pin structure includes a plurality of pins, and the plurality of pins are periodically arranged on two sides of the ridge structure. The microstrip structure is disposed in the second metal layer, and the microstrip structure is parallel to the ridge structure. A frame of the microstrip structure is separated from metal of the second metal layer by leaving a space.

In the technical solution of this application, the metal layers are mainly both laid on the two sides of the dielectric layer (for example, a PCB dielectric layer), thereby effectively reducing losses of energy and an electromagnetic wave during transmission, specifically, reducing energy losses of the energy and the electromagnetic wave in a process of passing through the dielectric layer. In addition, in this case, there may be plenty of space, so that a component is disposed on the metal layer (to be specific, the foregoing second metal layer) on a lower surface (the second side) of the dielectric, and the gap waveguide antenna structure can be integrated with another component or another functional module, in other words, integrability gets improved, thereby facilitating use of the antenna structure in various practical scenarios, and expanding an application range of the antenna structure.

It should be noted that the foregoing antenna structure can allow another component or another module to be integrated in the gap waveguide structure. Reasons are as follows: The second metal layer may act as a top metal layer of the gap waveguide structure, so that a width threshold of a slot between an upper surface of a pin and the top metal layer is increased, and a width threshold of a slot between an upper surface of the ridge structure and the top metal layer is increased. In addition, in this case, the metal layer (the second metal layer) is laid on the lower surface (the second side) of the dielectric layer, so that the component can be disposed on the second metal layer (the width threshold of the foregoing slot can allow the component to be disposed on the metal layer without affecting performance of the gap waveguide structure). For example, a component such as a capacitor, an inductor, or a resistor may be disposed on the second metal layer. For another example, an integrated module such as a chip or an integrated circuit may be disposed on the second metal layer. Details are no longer described one by one.

For example, it is assumed that an original gap range threshold is required to be A millimeters (mm), and A is a positive real number. In other words, a width of a slot between the top metal layer and the periodic pin structure cannot exceed A mm. However, in a conventional technology, at least a thickness of the PCB dielectric layer needs to be deducted from the slot threshold A mm. That is, assuming that the thickness of the PCB dielectric layer is B mm, and B is a positive real number less than A, in the conventional technology, a width of a slot between a lower surface (equivalent to the second side of the dielectric layer in this embodiment of this application) of the PCB dielectric layer and the periodic pin structure cannot exceed at least (A-B) mm. However, in this application, there is no impact of the PCB dielectric layer, and the width of the slot between the second side of the dielectric layer and the periodic pin structure only needs to not exceed A mm.

It should be further noted that, because a wavelength of an electromagnetic wave in a PCB dielectric is shorter than that in the air, in practice, in the conventional technology, a maximum value of the width of the slot between the lower surface of the PCB dielectric layer and the periodic pin structure further needs to be less than a value of A-B.

Optionally, when the dielectric layer in the gap waveguide antenna structure is the PCB dielectric layer, the first metal layer may be the ground of a PCB.

Optionally, the second metal layer may act as the top metal layer of the gap waveguide structure.

It should be noted that, in this embodiment of this application, there is no limitation on a shape, a height, a width, or other dimensions of the pin. For example, the pin may be a cuboid or another shape, for example, a cylinder.

It should be further noted that, in this embodiment of this application, there is also no limitation on a shape or a dimension of the microstrip structure, as long as the microstrip structure can be coupled to a gap waveguide and a coupling requirement can be met.

With reference to the first aspect, in some implementations of the first aspect, the microstrip structure may include a microstrip and a microstrip patch, the microstrip is connected to the microstrip patch, the microstrip patch is configured to radiate energy or an electromagnetic wave, and the microstrip is configured to transmit an electromagnetic signal to the microstrip patch. In this case, the microstrip structure equivalently has a structure form of a coplanar waveguide (CPW).

With reference to the first aspect, in some implementations of the first aspect, a plurality of via holes are provided around the microstrip structure and in the top layer, and the first metal layer communicates with the second metal layer through the plurality of via holes. Based on the foregoing settings, the microstrip structure can have a structure form of a grounded coplanar waveguide (GCPW), so that an electromagnetic wave or energy can be more easily (better) transmitted to the microstrip structure. The microstrip structure is coupled to the ridge structure of the gap waveguide structure, so that the energy or the electromagnetic wave is transmitted into a gap waveguide, and is finally transmitted out from a ridge waveguide port, thereby further reducing losses of the energy or the electromagnetic wave.

Optionally, when the plurality of via holes are provided, a distance between the via holes may be further controlled, so that the plurality of via holes are evenly distributed around the microstrip structure.

Optionally, in this embodiment of this application, the ridge structure may include a boundary ridge structure and a main ridge structure, and the boundary ridge structure is located at one end of the ridge structure.

With reference to the first aspect, in some implementations of the first aspect, the boundary ridge structure may be disposed on a side below the microstrip structure toward the bottom layer, and a slot is formed between an upper surface (a surface toward the top layer) of the boundary ridge structure and the microstrip structure. In the foregoing implementation, the slot is formed between the upper surface (the surface toward the top layer) of the boundary ridge structure and the microstrip structure, so that energy or an electromagnetic wave can be obtained by coupling the microstrip structure.

It should be noted that the boundary ridge structure is an optional structure. In other words, the antenna structure in this embodiment of this application may or may not include the boundary ridge structure. When the ridge structure includes the boundary ridge structure, in this case, dimensions of the boundary ridge structure may or may not be exactly consistent with dimensions of the main ridge structure. When the dimensions of the boundary ridge structure are consistent with the dimensions of the main ridge structure, it is equivalent to a case in which the ridge structure includes only the main ridge structure. When the ridge structure does not include the boundary ridge structure, it is equivalent that the ridge structure includes only the main ridge structure. In this case, dimensions of the ridge structure are the dimensions of the main ridge structure.

Optionally, when the microstrip structure includes the microstrip patch, a slot may be formed between the boundary ridge structure and the microstrip patch, so that energy or an electromagnetic wave can be obtained by coupling the microstrip patch of the microstrip structure.

Optionally, a dimension of the boundary ridge structure may be further set, for example, the boundary ridge structure is slightly higher than the ridge structure and/or slightly wider than the main ridge structure, so that the slot between the boundary ridge structure and the microstrip structure is narrower and/or an area that is of the boundary ridge structure and that may be used for coupling is larger, thereby improving a coupling capability and further increasing transmission efficiency of energy or an electromagnetic wave.

With reference to the first aspect, in some implementations of the first aspect, a height of the boundary ridge structure is greater than a height of the main ridge structure. In this case, the slot between the upper surface of the boundary ridge structure and the microstrip structure is narrower, thereby improving a coupling capability.

With reference to the first aspect, in some implementations of the first aspect, a width of the boundary ridge structure is greater than a width of the main ridge structure. In this case, an area of the upper surface of the boundary ridge structure is increased, and the area that can be used for coupling is increased, thereby improving a coupling capability.

According to a second aspect, an electronic device is provided. The terminal includes an antenna having the gap waveguide antenna structure in any one of the first aspect or the possible implementations of the first aspect.

Optionally, the electronic device may include a feeding unit and the antenna. The feeding unit is configured to provide an electromagnetic signal for the antenna, and the antenna may include any one of the gap waveguide antenna structures in the embodiments of this application.

Optionally, the electronic device may be any type of terminal device that can transmit energy or an electromagnetic wave by using the antenna structure, such as a mobile phone, a tablet, a computer, a vehicle-mounted terminal, or a wearable device.

DESCRIPTION OF EMBODIMENTS

The following describes technical solutions in embodiments of this application with reference to the accompanying drawings in embodiments of this application.

Figure 1:
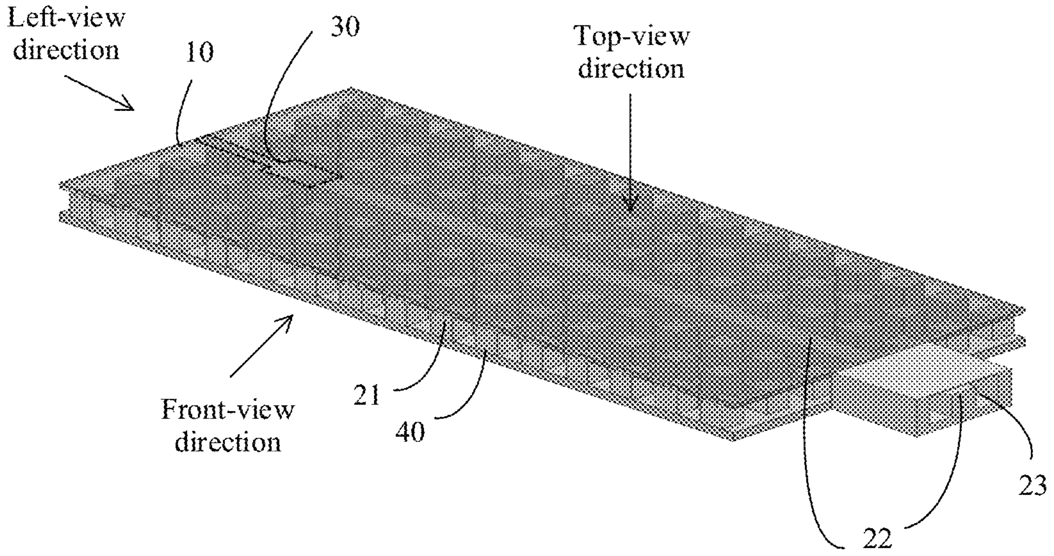
FIG. 1 is a schematic diagram of a gap waveguide antenna structure.

FIG. 1 is a schematic diagram of a gap waveguide antenna structure. As shown in FIG. 1, the gap waveguide antenna structure includes a top layer 10, a gap waveguide structure 20, a microstrip structure 30, and a bottom layer 40.

The top layer 10 includes a metal layer, and the metal layer acts as the ground of a PCB board. The top layer 10 further includes a PCB dielectric layer, and the metal layer is laid on an upper surface of the PCB dielectric layer.

The gap waveguide structure 20 includes a periodic pin structure 21 and a ridge structure 22, and is disposed on an upper surface of the bottom layer 40. A slot is formed between the gap waveguide structure 20 and the top layer 10. Specifically, the slot is formed between an upper surface of the periodic pin structure 21 and a lower surface of the PCB dielectric layer and between an upper surface of the ridge structure 22 and the lower surface of the PCB dielectric layer. The periodic pin structure 21 includes a plurality of pins, and the plurality of pins are periodically arranged. The ridge structure 22 is located among the plurality of pins, a length direction of the ridge structure 22 is parallel to an arrangement direction of the pins, and an end of the ridge structure 22 is connected to the ridge waveguide port 23.

The ground (the metal layer) of the PCB board also acts as a top metal layer of the gap waveguide structure 20.

The microstrip structure 30 is disposed on a lower surface of the top layer 10, and specifically, disposed on the lower surface of the PCB dielectric layer 12 and over the ridge structure 22, and disposed at an end of the top layer 10 away from the end of the ridge structure 22. The microstrip structure 30 includes a microstrip 32 and a microstrip patch 33, the microstrip 32 is connected to the microstrip patch 33, the microstrip patch 33 is configured to radiate energy or an electromagnetic wave, and the microstrip 32 is configured to transmit an electromagnetic signal to the microstrip patch 33.

In FIG. 1, a frame (may be alternatively understood as a boundary) of the microstrip structure 30 is represented by a dashed line, because the microstrip structure 30 is disposed on the lower surface of the top layer 10, and is equivalently blocked by the PCB dielectric layer and the metal layer.

The top layer 10 is disposed in parallel to the bottom layer 40.

Figure 2:
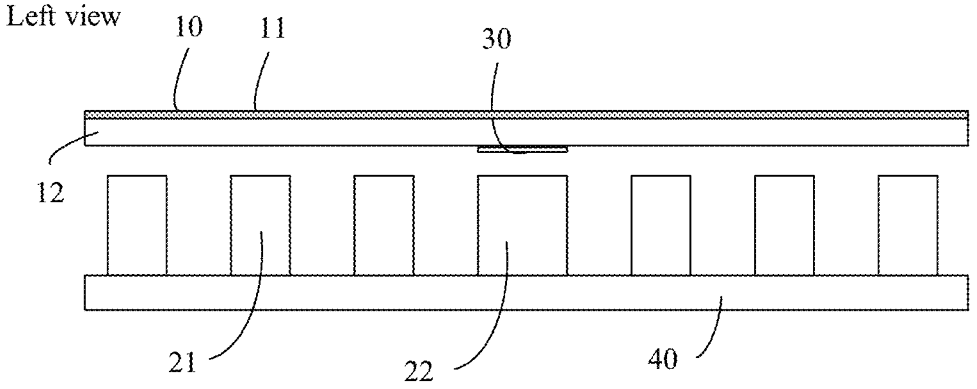
FIG. 2 is a left view of the gap waveguide antenna structure in FIG. 1.

FIG. 2 is a left view of the gap waveguide antenna structure shown in FIG. 1. An inter-layer relationship of the gap waveguide antenna structure may be clearly seen from FIG. 2.

As shown in FIG. 2, a metal layer 11 is laid on the upper surface of the PCB dielectric layer 12.

The gap waveguide structure 20 is disposed on the upper surface of the bottom layer 40. The slot is formed between the gap waveguide structure 20 and the top layer 10. Specifically, the slot is formed between the upper surface of the periodic pin structure 21 and the lower surface of the PCB dielectric layer and between the upper surface of the ridge structure 22 and the lower surface of the PCB dielectric layer.

The gap waveguide structure needs to include one top metal layer. A slot needs to exist both between the top metal layer and the upper surface of the periodic pin structure below and between the top metal layer and the upper surface of the ridge structure below, and a requirement on a width of the slot is put forward. In a conventional technology, the ground (the metal layer 11) of the PCB board also acts as the top metal layer of the gap waveguide structure 20. However, due to existence of the PCB dielectric layer 12, the width of the foregoing slot is mostly occupied by the PCB dielectric layer 12. Consequently, both the slot between the lower surface of the PCB dielectric layer 12 and the upper surface of the periodic pin structure below and the slot between the lower surface of the PCB dielectric layer 12 and the upper surface of the ridge structure below are relatively narrow.

The microstrip structure 30 is disposed on the lower surface of the top layer 10, and specifically, disposed on the lower surface of the PCB dielectric layer 12 and over the ridge structure 22.

The top layer 10 is disposed in parallel to the bottom layer 40.

In the gap waveguide antenna structure shown in FIG. 1 and FIG. 2, in addition to the microstrip structure 30 disposed, no other metal is included on the lower surface of the PCB dielectric layer 12. However, a large quantity of energy is lost in a process of passing through the PCB dielectric layer 12. Consequently, energy transmission efficiency is low. In addition, it is difficult to embed another component between or among the microstrip and the gap waveguide structure 20. As mentioned above, due to a structural requirement on the gap waveguide structure 20 and existence of the PCB dielectric layer 12, both the slot between the lower surface of the PCB dielectric layer 12 and the upper surface of the periodic pin structure below and the slot between the lower surface of the PCB dielectric layer 12 and the upper surface of the ridge structure below are relatively narrow. In addition to the microstrip structure 30, no other metal exists on the lower surface of the PCB dielectric layer 12. Therefore, the component cannot be disposed in the slot. That is, it is difficult to integrate the gap waveguide antenna structure with another component, another functional module, or the like. If integration is forcibly performed, the integration can be performed only by squeezing a location of the pin, and the original gap waveguide structure is destroyed. Consequently, an electromagnetic wave or energy that can be generated by coupling the gap waveguide antenna structure is reduced, and energy transmission efficiency is reduced.

For the foregoing problem, an embodiment of this application puts forward a new gap waveguide structure. A metal layer is laid on two sides of a top layer, so that energy losses of energy and an electromagnetic wave in a process of passing through a PCB dielectric layer are reduced. In addition, a metal layer on a lower surface of the PCB dielectric layer may act as a top metal layer of the gap waveguide structure, so that a width threshold of a slot between an upper surface of a pin and the top metal layer is increased, a width threshold of a slot between an upper surface of a ridge structure and the top metal layer is increased. In addition, in this case, the metal layer is laid on the lower surface of the PCB dielectric layer, so that a component can be disposed on the metal layer on the lower surface of the PCB dielectric layer (the width threshold of the foregoing slot can allow the component to be disposed on the metal layer without affecting performance of the gap waveguide structure), and the gap waveguide antenna structure can be integrated with another component or another functional module, thereby facilitating use of the antenna structure in various practical scenarios, and expanding an application range of the antenna structure. For example, a component such as a capacitor, an inductor, or a resistor may be disposed on the metal layer (the following second metal layer). For another example, an integrated module such as a chip or an integrated circuit may be disposed on the metal layer (the following second metal layer). Details are no longer described one by one.

Figure 3:
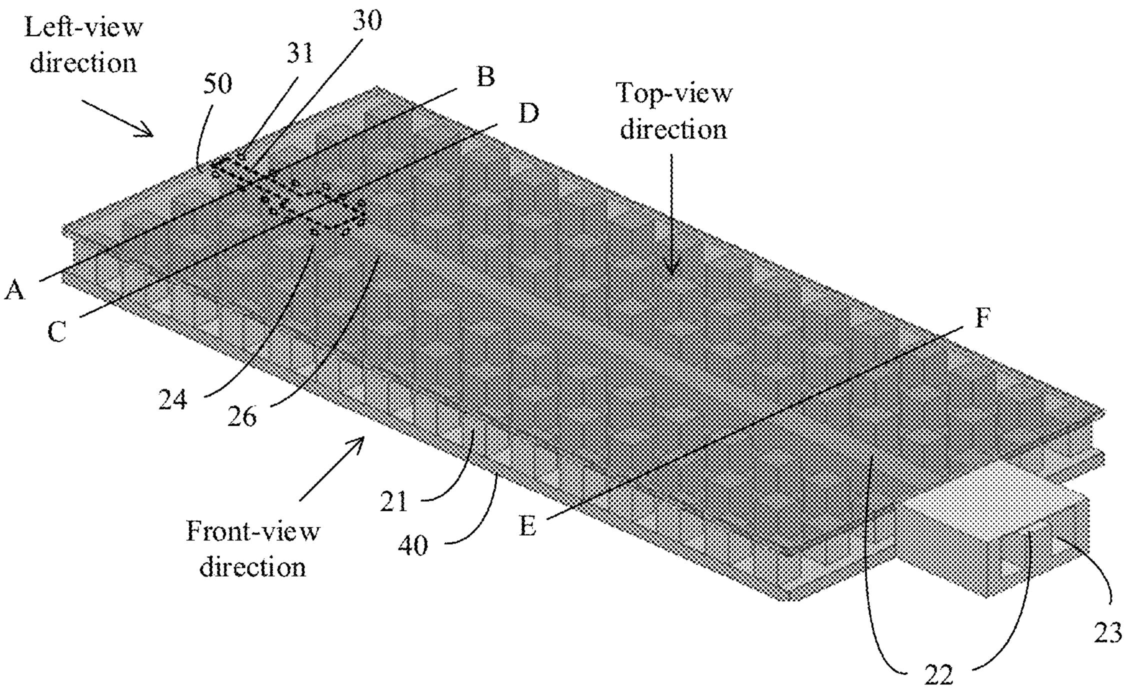
FIG. 3 is a schematic diagram of a gap waveguide antenna structure according to an embodiment of this application.

FIG. 3 is a schematic diagram of a gap waveguide antenna structure according to an embodiment of this application. As shown in FIG. 3, the gap waveguide antenna structure includes a top layer 50, a gap waveguide structure 20, a microstrip structure 30, and a bottom layer 40.

The top layer 50 includes a first metal layer, a dielectric layer, and a second metal layer. The first metal layer is laid on an upper surface (a first side) of the dielectric layer, and the first metal layer is laid on a lower surface of the dielectric layer. In an implementation, the first metal layer may act as the ground of a PCB.

Optionally, the foregoing dielectric layer may act as a PCB dielectric layer.

A metal layer is laid on both an upper layer and a lower layer of the PCB, so that a stopband structure of the gap waveguide structure can be ensured. In addition, a metallic ground is laid on both the upper layer and the lower layer of the PCB, so that losses of an electromagnetic wave or energy during transmission can be effectively reduced.

The gap waveguide structure 20 includes a periodic pin structure 21 and a ridge structure 22. The periodic pin structure 21 and the ridge structure 22 are disposed on a side of the bottom layer 40 close to the top layer 50. A slot is formed between the periodic pin structure 21 and the top layer 50 and between the ridge structure 22 and the top layer 50. Specifically, the slot is formed between upper surfaces of the periodic pin structure 21 and the ridge structure 22 (surfaces toward the top layer 50) and the second metal layer 53. The periodic pin structure 21 includes a plurality of pins, and the plurality of pins are periodically arranged on two sides of the ridge structure 22. That is, the plurality of pins are distributed on two sides of a length direction of the ridge structure 22, and an end of the ridge structure 22 is connected to a ridge waveguide port 23.

It is learned according to the foregoing that, in addition to the foregoing periodic pin structure 21 and ridge structure 22, the gap waveguide structure 20 further needs to include a top-layer metal structure. In addition, a gap needs to exist both between the top-layer metal structure and the periodic pin structure 21 and between the top-layer metal structure and the ridge structure 22. A size of the gap determines a stopband feature of a gap waveguide. However, a difference from those shown in FIG. 1 and FIG. 2 is that, assuming that the dielectric layer in FIG. 3 is the PCB dielectric layer, in the structure shown in FIG. 3, the second metal layer is used as the top-layer metal structure of the gap waveguide structure 20, so that a slot (a gap) between a top metal layer and the periodic pin structure 21 and a slot (a gap) between the top metal layer and the ridge structure 22 have a wider width range. For example, it is assumed that an original gap range threshold is required to be A millimeters (mm), and A is a positive real number. In other words, a width of the slot between the top metal layer and the periodic pin structure cannot exceed A mm. However, in a conventional technology, at least a thickness of the PCB dielectric layer needs to be deducted from the slot threshold A mm. That is, assuming that the thickness of the PCB dielectric layer is B mm, and B is a positive real number less than A, in the conventional technology, a width of a slot between a lower surface of the PCB dielectric layer and the periodic pin structure cannot exceed at least (A-B) mm. However, in this application, there is no impact of the PCB dielectric layer, and the width of the slot between the second side of the dielectric layer 52 and the periodic pin structure 21 only needs to not exceed A mm.

It should be understood that, because a wavelength of an electromagnetic wave in a PCB dielectric is shorter than that in the air, in practice, in the conventional technology, a maximum value of the width of the slot between the lower surface (a surface without a metallic ground) of the PCB dielectric layer and the periodic pin structure further needs to be less than a value of A-B.

It should be noted that, in this embodiment of this application, there is no limitation on a shape, a height, a width, or other dimensions of the pin. For example, the pin may be a cuboid shown in FIG. 3 or another shape, for example, a cylinder.

The microstrip structure 30 is disposed on the lower surface of the dielectric layer (in other words, disposed in the second metal layer), and is parallel to the ridge structure 22. The microstrip structure 30 is disposed at an end away from an end (a side of the ridge waveguide port 23) of the ridge structure 22.

Optionally, the microstrip structure 30 includes a microstrip 32 and a microstrip patch 33, the microstrip 32 is connected to the microstrip patch 33, the microstrip patch 33 is configured to radiate energy or an electromagnetic wave, and the microstrip 32 is configured to transmit an electromagnetic signal to the microstrip patch 33.

It should be noted that, in this embodiment of this application, there is also no limitation on a shape of the microstrip structure 30, as long as the microstrip patch 33 of the microstrip structure 30 can be coupled to the gap waveguide and a coupling requirement can be met.

The top layer 50 is disposed in parallel to the bottom layer 40.

It should be noted that, when the gap waveguide antenna structure in FIG. 3 has the foregoing structure, the metal layer is laid on the two sides of the dielectric layer, and the stopband structure is formed, so that losses of energy and an electromagnetic wave during transmission can be effectively reduced. In addition, the second metal layer may act as the top metal layer of the gap waveguide structure, so that a width threshold of a slot between an upper surface of the pin and the top metal layer is increased, a width threshold of a slot between the upper surface of the ridge structure and the top metal layer is increased. In addition, in this case, the metal layer is laid on the lower surface of the dielectric layer, so that a component can be disposed on the metal layer (to be specific, the second metal layer) on the lower surface of the PCB dielectric layer (the width threshold of the foregoing slot can allow the component to be disposed on the metal layer without affecting performance of the gap waveguide structure), and the gap waveguide antenna structure can be integrated with another component or another functional module, thereby facilitating use of the antenna structure in various practical scenarios, and expanding an application range of the antenna structure.

Optionally, via holes may be further provided around the microstrip structure 30, so that losses of energy or an electromagnetic wave are further reduced.

Optionally, a plurality of via holes 31 may be provided on a periphery of a frame (a boundary) of the microstrip structure 30, and the plurality of via holes 31 can enable the first metal layer 51 of the top layer 50 to communicate with the second metal layer 53, as shown in FIG. 3. In other words, the plurality of via holes 31 may be provided around the microstrip structure 30 and in the top layer 50, and the plurality of via holes 31 can enable the first metal layer 51 to communicate with the second metal layer 53. However, it should be understood that there is no limitation on how to distribute the plurality of via holes 31 or a quantity. The via holes are provided, so that the first metal layer can communicate with the second metal layer, and an electromagnetic signal is more easily transmitted to the microstrip structure 30. In addition, the via holes are provided, so that the microstrip structure 30 can further have a GCPW structure, to have a stronger radiation capability, thereby increasing transmission efficiency of energy or an electromagnetic wave.

Optionally, when the plurality of via holes 31 are provided, a distance between the via holes 31 may be further controlled, so that the plurality of via holes 31 are evenly distributed around the microstrip structure 30.

It should be noted that the microstrip structure 30 is blocked in FIG. 3, and it is difficult to show a specific inter-layer structure. Therefore, content of how to provide the via hole and how to further improve the microstrip structure 30 is described below in detail, and is no longer described herein.

Optionally, a height of a part of the ridge structure 22 may be further increased. Specifically, a height of a part of the ridge structure 22 located below the microstrip is increased, so that a slot between the microstrip structure 30 and a part of the ridge structure 22 after the architecture becomes narrow, thereby increasing a coupling capability. The part is shielded by the top layer 50 and the microstrip structure 30 in FIG. 3 and is difficult to display. Therefore, content of the part is also described in detail when views in different view directions are described below.

Figure 4:
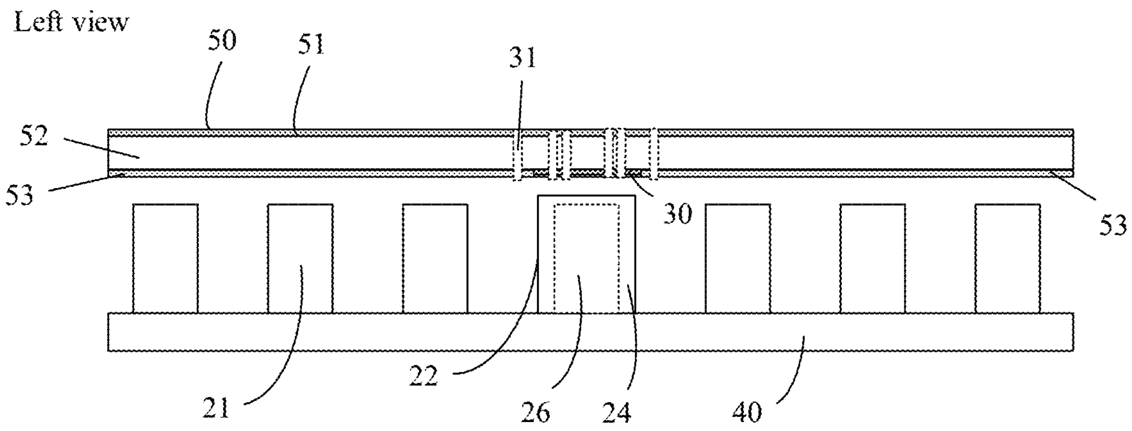
FIG. 4 is a left view of a gap waveguide antenna structure according to an embodiment of this application.

FIG. 4 is a left view of a gap waveguide antenna structure according to an embodiment of this application. As shown in FIG. 4, a first metal layer 51 is laid on an upper surface (a first side) of a dielectric layer 52, and the first metal layer 53 is laid on a lower surface of the dielectric layer 52. A periodic pin structure 21 and a ridge structure 22 are disposed on a side of a bottom layer 40 close to a top layer. A slot is formed between the periodic pin structure 21 and the top layer 50 and between the ridge structure 22 and the top layer 50. Specifically, the slot is formed between upper surfaces of the periodic pin structure 21 and the ridge structure 22 (surfaces toward the top layer 50) and the second metal layer 53.

As shown in FIG. 4, the top layer 50 is disposed in parallel to the bottom layer 40.

The second metal layer 53 may act as a top-layer metal structure of a gap waveguide structure 20.

A microstrip structure 30 is disposed on a second side of the dielectric layer in the top layer 50, and is parallel to the ridge structure 22. The microstrip structure 30 is disposed over the ridge structure 22. It may be understood that the microstrip structure 30 is disposed in the second metal layer and is separated from metal of the second metal layer.

Optionally, the microstrip structure 30 includes a microstrip 32 and a microstrip patch 33, the microstrip 32 is connected to the microstrip patch 33, the microstrip patch 33 is configured to radiate energy or an electromagnetic wave, and the microstrip 32 is configured to transmit an electromagnetic signal to the microstrip patch 33.

It should be noted that, in this embodiment of this application, because the second metal layer 53 is laid on a lower surface (a second side) of the PCB dielectric layer 52, when the microstrip structure 30 is disposed, a part of a periphery of a frame of the microstrip structure 30 needs to be set as a space 34. The space 34 may be understood as that there is no metal in the part, and the PCB dielectric layer 52 is exposed. This may be implemented in some common manners of processing a PCB board. Details are no longer described herein.

Figure 5:
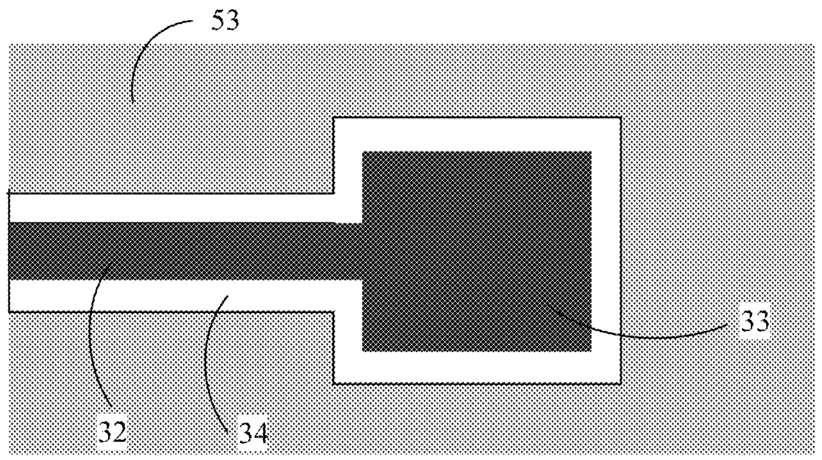
FIG. 5 is a schematic diagram of a microstrip structure 30 having a structure form of a CPW according to an embodiment of this application.

FIG. 5 is a schematic diagram of a microstrip structure 30 having a structure form of a CPW according to an embodiment of this application. In a conventional technology, a second metal layer 53 does not exist, and the microstrip structure 30 is directly disposed on a lower surface of a PCB dielectric layer 12 (as shown in FIG. 1 and FIG. 2). Therefore, a space 34 is not needed. However, in this embodiment of this application, the space 34 needs to be provided.

As shown in FIG. 5, the microstrip structure 30 includes a microstrip 32 (shown as a black bar on a left side in FIG. 5) and a microstrip patch 33 (shown as a black rectangle on a right side in FIG. 5), and the microstrip 32 is connected to the microstrip patch 33. The microstrip 32 is configured to transmit an electromagnetic signal to the microstrip patch 33, for example, to transmit an electromagnetic signal from a chip, another circuit, or the like to the microstrip patch 33. The microstrip patch 33 is configured to radiate energy or an electromagnetic wave. Spaces 34 are all provided on a periphery (for example, on two sides of the microstrip 32 and around an outer frame of the microstrip patch 33) of the microstrip structure 30, so that both the microstrip 32 and the microstrip patch 33 are separated from metal of the second metal layer 53.

It should be noted that the microstrip structure 30 shown in FIG. 5 is a microstrip structure having a structure form of a CPW. To further increase energy transmission efficiency, the microstrip structure 30 may be further improved.

Optionally, the microstrip structure 30 may be enabled to have a structure form of a grounded coplanar waveguide. Details are described below with reference to FIG. 6.

Figure 6:
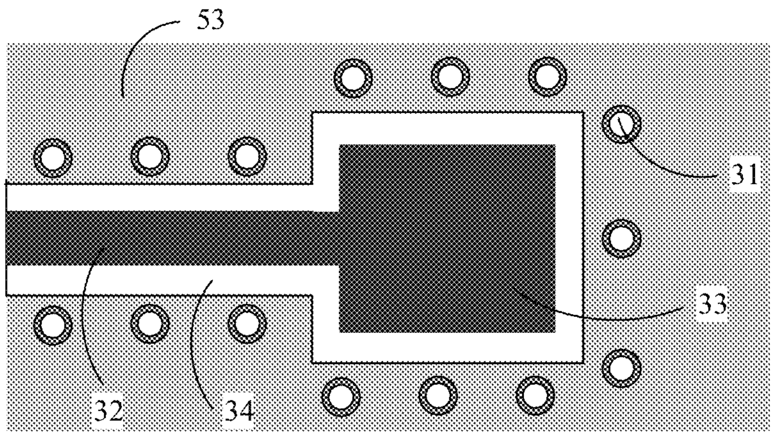
FIG. 6 is a schematic diagram of a microstrip structure 30 having a structure form of a GCPW according to an embodiment of this application.

FIG. 6 is a schematic diagram of a microstrip structure 30 having a structure form of a GCPW according to an embodiment of this application. As shown in FIG. 6, the microstrip structure 30 includes a microstrip 32 (shown as a black bar on a left side in FIG. 6) and a microstrip patch 33 (shown as a black rectangle on a right side in FIG. 6) connected to the microstrip 32. Spaces 34 are provided on a periphery of a frame of the microstrip structure 30, so that the spaces 34 separate the microstrip structure 30 from metal of a second metal layer 53. In addition to the spaces 34 on the periphery of the frame of the microstrip structure 30, a plurality of via holes 31 are further provided, and a first metal layer 51 communicates with the second metal layer 52 by using the plurality of via holes 31. The microstrip structure 30 shown in FIG. 6 and having the structure form of the GCPW can effectively increase transmission efficiency of energy or an electromagnetic wave. An electromagnetic wave or energy can be more easily (better) transmitted to the microstrip structure 30; and a microstrip patch 33 of the microstrip structure 30 is coupled to a ridge structure of a gap waveguide structure 20, so that the energy or the electromagnetic wave is transmitted into a gap waveguide, and is finally transmitted out from a ridge waveguide port 23.

Optionally, in this embodiment of this application, the ridge structure 22 may include a boundary ridge structure 24 and a main ridge structure 26, and the boundary ridge structure 24 is located at one end of the ridge structure. The main ridge structure 26 may be considered as a part of the ridge structure 22 except the boundary ridge structure 24. As shown in FIG. 4, below the microstrip structure 30, an outer wide part (a part in a solid-line frame) is a projection of the boundary ridge structure 24 in a left view, and an inner narrow part (a part in a dashed-line frame) is a projection of the main ridge structure 24 in the left view.

It should be noted that the boundary ridge structure 24 is an optional structure. In other words, an antenna structure in this embodiment of this application may or may not include the boundary ridge structure 24. When the ridge structure 22 includes the boundary ridge structure 24, in this case, dimensions of the boundary ridge structure 24 may or may not be exactly consistent with dimensions of the main ridge structure 26. When the dimensions of the boundary ridge structure 24 are consistent with the dimensions of the main ridge structure 26, it is equivalent to a case in which the ridge structure 22 includes only the main ridge structure 26. When the ridge structure 22 does not include the boundary ridge structure 24, it is equivalent that the ridge structure 22 includes only the main ridge structure 26. In this case, dimensions of the ridge structure 22 are dimensions of the main ridge structure 26.

Optionally, a slot may be formed between an upper surface of the boundary ridge structure 24 and the microstrip structure 30, to obtain energy or an electromagnetic wave by coupling the microstrip structure 30. For example, the boundary ridge structure 24 may be disposed below the microstrip structure 30, and the slot is formed between the upper surface of the boundary ridge structure 24 and the microstrip structure 30.

Optionally, a slot may be formed between the boundary ridge structure 24 and the microstrip patch 33 of the microstrip structure 30, so that energy or an electromagnetic wave can be obtained by coupling the microstrip patch 33 of the microstrip structure 30.

Optionally, a dimension of the boundary ridge structure 24 may be further set, for example, the boundary ridge structure 24 is slightly higher than the ridge structure and/or slightly wider than the main ridge structure 26, so that the slot between the boundary ridge structure 24 and the microstrip structure 30 becomes narrow and/or an area that is of the boundary ridge structure 24 and that may be used for coupling becomes large, thereby improving a coupling capability and further increasing transmission efficiency of energy or an electromagnetic wave.

It should be noted that the dimensions of the boundary ridge structure 24 may have various cases. For example, a width of the boundary ridge structure 24 may be consistent with that of the main ridge structure 26, but a height of the boundary ridge structure 24 is greater than that of the main ridge structure 26, so that the slot between the upper surface of the boundary ridge structure 24 and the microstrip structure 30 is narrower, thereby improving a coupling capability. For another example, a height of the boundary ridge structure 24 may be consistent with that of the main ridge structure 26, but a width of the boundary ridge structure 24 is greater than that of the main ridge structure 26, so that an area that can be used for coupling and that is of the upper surface (a surface close to the top layer 50) of the boundary ridge structure 24 is larger, thereby improving a coupling capability. For another example, a height of the boundary ridge structure 24 may be further greater than that of the main ridge structure 26, and a width of the boundary ridge structure 24 is greater than that of the main ridge structure 26, so that the slot between the upper surface of the boundary ridge structure 24 and the microstrip structure 30 is narrower and an area that can be used for coupling and that is of the upper surface of the boundary ridge structure 24 is larger, thereby improving a coupling capability.

Optionally, the dimensions of the boundary ridge structure 24 may be alternatively set to be adjustable. In other words, the height and/or the width may be adjusted. For example, a concave structure may be disposed and buckled upside down at one end of the ridge structure 22. With reference to FIG. 4, a left-view projection of the concave structure is equivalent to a concave shape obtained after 26 represented by a dashed-line box is removed from 24 represented by a solid-line box. The concave structure and the one end of the ridge structure 22 covered by the concave structure together constitute the boundary ridge structure 24. After the disposing, the concave structure is detachable, can be replaced with concave structures of different sizes, and then buckled upside down at the one end of the ridge structure 22, thereby changing the dimensions of the boundary ridge structure 24.

From the left view of FIG. 4, an inter-layer structure relationship of the antenna structure in this embodiment of this application may be clearly obtained. Specific content is described above. However, FIG. 5 and FIG. 6 respectively show the microstrip structure 30 in the two structure forms of the CPW and the GCPW. However, it should be understood that the microstrip structure 30 may also have other structure forms, as long as a requirement on coupling between gap waveguide structures 20 can be satisfied, and there is no limitation on a shape or a dimension.

Figure 7:
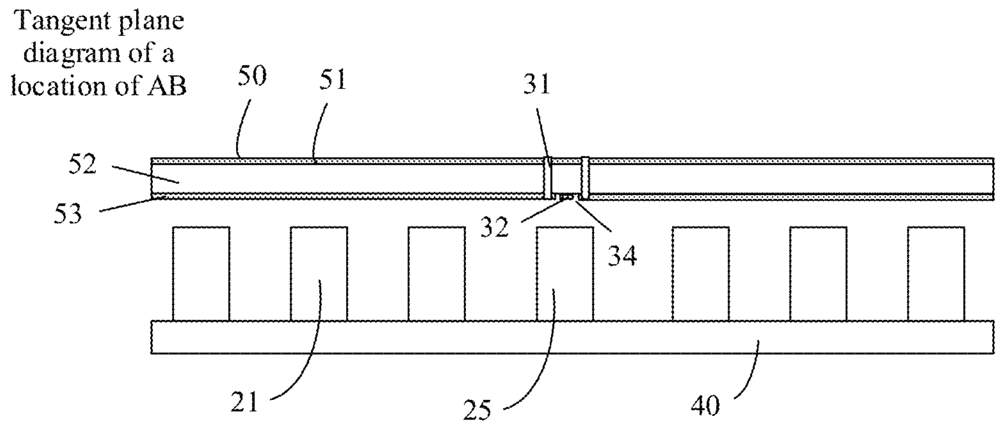
FIG. 7 is a tangent plane diagram of a location of AB in FIG. 3.
Figure 8:
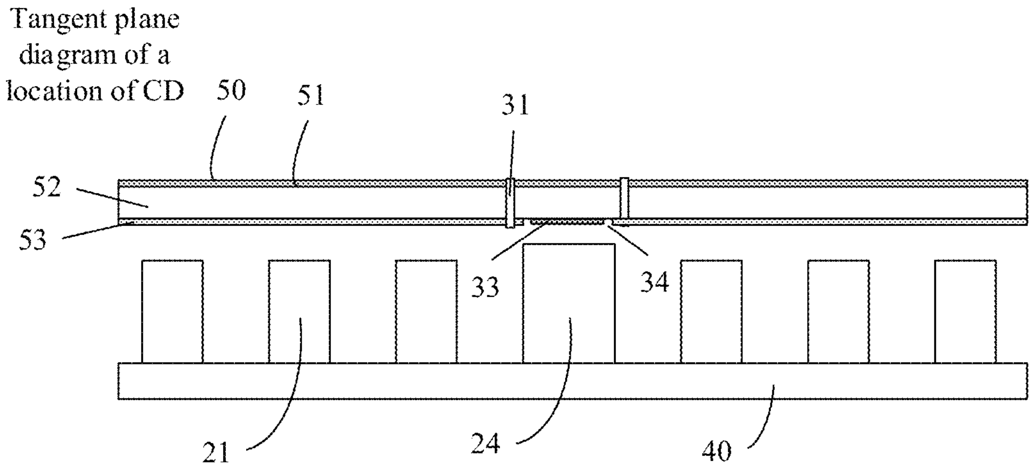
FIG. 8 is a tangent plane diagram of a location of CD in FIG. 3.
Figure 9:
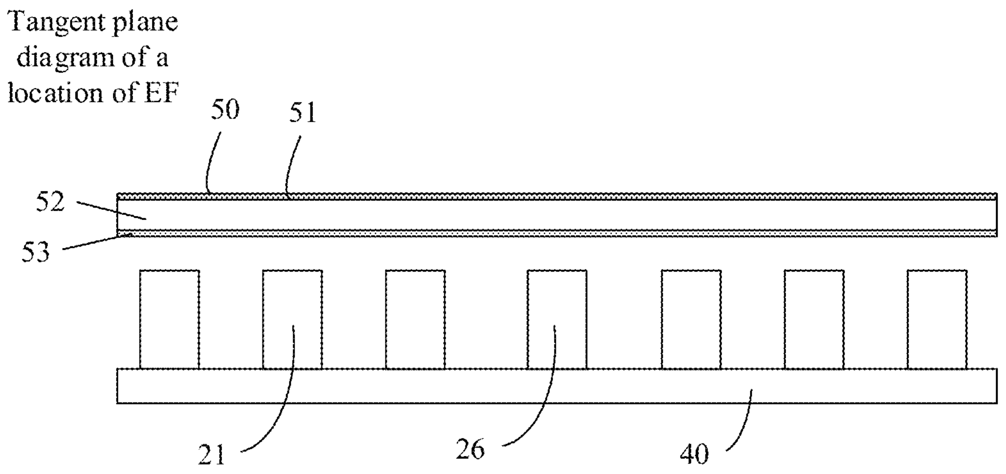
FIG. 9 is a tangent plane diagram of a location of EF in FIG. 3.

To facilitate further understanding of the inter-layer structure relationship in this embodiment of this application, tangent plane diagrams at three locations are further provided below. FIG. 7 is the tangent plane diagram of the location of AB in FIG. 3, and can be understood as a diagram observed from a left-view direction after cutting is performed from a line where AB is located. FIG. 8 is the tangent plane diagram of the location of CD in FIG. 3, and can be understood as a diagram observed from a left-view direction after cutting is performed from a line where CD is located. FIG. 9 is the tangent plane diagram of the location of EF in FIG. 3, and can be understood as a diagram observed from a left-view direction after cutting is performed from a line where EF is located.

It should be noted that an example in which the microstrip structure 30 has the structure form of the GCPW and the microstrip structure 30 is located at the location shown in FIG. 3 is used for description in all of FIG. 7 to FIG. 9.

As can be seen from FIG. 7, a microstrip structure 30 at AB is a microstrip 32 of the microstrip structure 30, and spaces 34 are provided on two sides of the microstrip 32. There is exactly one via hole on either of two sides of an outer side of the space 34, to enable the first metal layer 51 to communicate with the second metal layer 53. A boundary pin 25, instead of the ridge structure 22, is below the microstrip 32. However, it should be understood that the microstrip structure 30 in this application may have a plurality of shapes, and there are also a plurality of quantities and specific providing manners of via holes. Therefore, FIG. 7 is only a tangent plane diagram in a possible case, or a structure shown in FIG. 7 may not be used. For example, only one via hole 31 may be provided on the tangent plane. For another example, the tangent plane may have no via hole 31. For another example, a part of the ridge structure 22, instead of the boundary pin 25, is below the microstrip structure 30 with the tangent plane, or the tangent plane may even be formed by cutting a gap between the boundary pin 25 and the ridge structure 22. Details are no longer described one by one.

It can be seen from FIG. 8 that a microstrip structure 30 at CD is a microstrip patch 33 of the microstrip structure 30, spaces 34 are both provided on two sides of the microstrip patch 33, one via hole 31 exactly on either of the two sides of the microstrip patch 33 appears on the tangent plane, and the boundary ridge structure 24 of the ridge structure 22 is below the microstrip patch 33. However, it should be understood that the microstrip structure 30 in this application may have a plurality of shapes, and there are also a plurality of quantities and specific providing manners of via holes. Therefore, FIG. 8 is also only a tangent plane diagram in a possible situation, or a case shown in FIG. 8 may not be used. Details are no longer described one by one.

As can be seen from FIG. 9, EF includes none of the microstrip structure 30, the via hole 31, and the space 34, and only a plurality of pins 21 and the main ridge structure 26 are included below a second metal layer 53.

The antenna structure in this embodiment of this application may be further understood from the three tangent plane diagrams shown in FIG. 7 to FIG. 9, and the three tangent plane diagrams may be considered as further descriptions of the left view. Therefore, for omitted content, refer to the foregoing related descriptions, such as the top layer 50 and an inter-layer structure of the top layer.

Figure 10:
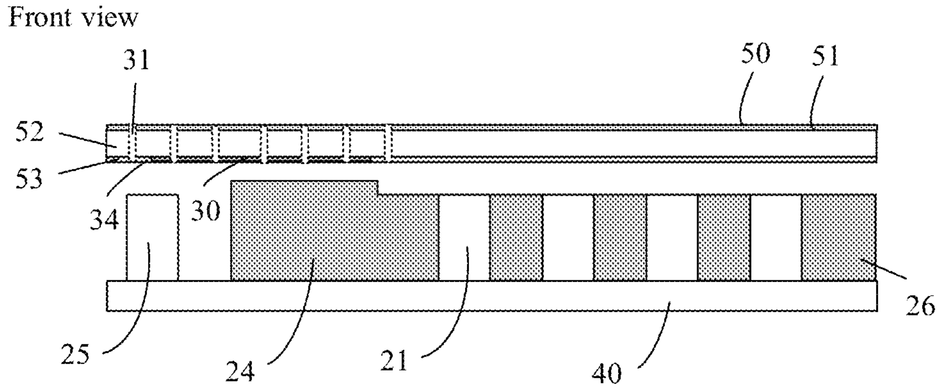
FIG. 10 is a front view of a gap waveguide antenna structure according to an embodiment of this application.

FIG. 10 is a front view of a gap waveguide antenna structure according to an embodiment of this application. As shown in FIG. 10, a boundary pin 25 and a boundary ridge structure 24 are below a microstrip structure 30. It may also apparently be seen from FIG. 10 that the boundary ridge structure 24 is a part of a ridge structure 22.

It should be noted that, in FIG. 9, to facilitate distinguishing between the ridge structure 22 and a periodic pin structure 21, the ridge structure 22 and the periodic pin structure 21 are distinguished by color, and the ridge structure 22 is represented by gray.

Optionally, the ridge structure 22 may include the boundary ridge structure 24 and a main ridge structure 26, and the boundary ridge structure 24 is located at one end of the ridge structure 22. The main ridge structure 26 may be considered as a part of the ridge structure 22 except the boundary ridge structure 24.

Optionally, dimensions of the boundary ridge structure 24 may or may not be consistent with dimensions of the main ridge structure 26. When the dimensions are inconsistent, a height of the boundary ridge structure 24 may be greater than a height of the main ridge structure 26 and/or a width of the boundary ridge structure 24 may be greater than a width of the main ridge structure 26. It should be noted that, from the front view of FIG. 10, only the height of the boundary ridge structure 24 can be displayed, but the width of the boundary ridge structure 24 cannot be displayed. The width of the boundary ridge structure 24 is shown in FIG. 4 or FIG. 8.

It should be further noted that, because FIG. 10 is a projection view, an effect presented by the microstrip structure 30 is that the microstrip structure 30 is entirely embedded in a second metal layer 53, and a space 34 is also shielded. Such a case may be described with reference to descriptions of another view. It should be further understood that, for another structure and component not described in FIG. 10, reference may be made to the related descriptions above. Details are no longer repeated for brevity.

Figure 11:
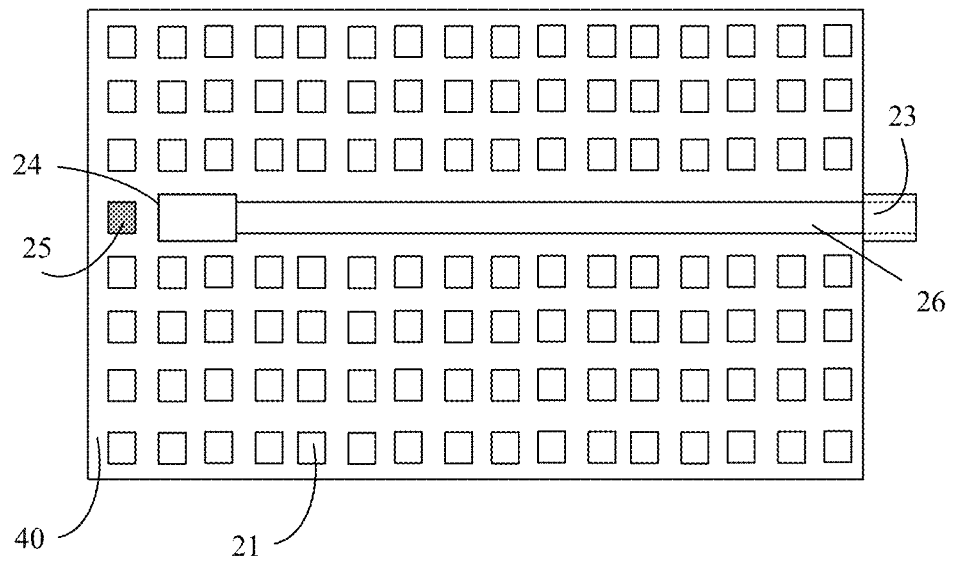
FIG. 11 is a top view of a gap waveguide antenna structure after a top layer 50 is removed according to an embodiment of this application.

For a top view, due to impact of a top layer 50, another structure is blocked, only a first metal layer 51 of a top layer 50 and a via hole 31 can be shown, and another part can be represented only by a dashed line, thereby affecting a presentation effect of the structure. Therefore, the top view is omitted. FIG. 11 is a top view of a gap waveguide antenna structure after a top layer 50 is removed according to an embodiment of this application. As shown in FIG. 11, it can be seen from the top view that pins of a periodic pin structure 21 are periodically arranged and distributed on two sides of a ridge structure 22. A boundary pin 25 is located on a left side of the ridge structure 22, and a left part of the ridge structure 22 is a boundary ridge structure 24. A right part is a main ridge structure 26, and a right end of the main ridge structure 26 is connected to a ridge waveguide port 23. The periodic pin structure 21, the ridge structure 22, and the boundary pin 25 are all disposed on a bottom layer 40.

In the foregoing, it has been explained that there is no limitation on the dimension, the shape, or the like of each constituent part of the gap waveguide antenna structure in this embodiment of this application. The gap waveguide antenna structure in this embodiment of this application and a test result of a transmission effect of the gap waveguide antenna structure are described below by using a specific example.

In an example, a board thickness of a PCB is 5 mils (mil), that is, 0.125 millimeters (mm). A pin is a cuboid, and dimensions of the pin are 0.5 mm×0.5 mm×0.8 mm. In other words, the pin is a cuboid of which both a length and a width are 0.5 mm and a height is 0.8 mm. One of two planes of 0.5 mm×0.5 mm is an upper surface and the other is a lower surface. A slot is formed between the upper surface and a second metal layer 53 of the top layer 50, and the lower surface of the pin is disposed on an upper surface of the bottom layer 40. A height (a ridge height) of the main ridge structure 26 of the ridge structure 22 is 0.8 mm, a width of the main ridge structure 26 is 0.575 mm, and a length of the ridge structure 22 (a length of the boundary ridge structure 24 plus a length of the main ridge structure 26) may be set depending on an actual requirement, for example, may be 2 cm or 3.5 cm. A slot is formed between an upper surface of the ridge structure 22 and the second metal layer 53, and a lower surface of the ridge structure 22 is disposed on the upper surface of the bottom layer 40. Dimensions of the boundary ridge structure 24 are 1.5 mm×0.85 mm×0.944 mm. In other words, the length of the boundary ridge structure 24 (a dimension along a length direction of the ridge structure 22) is 1.5 mm, and is much shorter than the length of the main ridge structure 26. A width of the boundary ridge structure 24 is 0.85 mm, and is slightly greater than the width 0.575 mm of the main ridge structure 26. A height of the boundary ridge structure 24 is 0.944 mm, and is greater than the height 0.8 mm of the main ridge structure 26, so that a slot formed between an upper surface of the boundary ridge structure 24 and the second metal layer 53 is narrower, and a lower surface of the boundary ridge structure 24 is disposed on the upper surface of the bottom layer 40. Dimensions of a microstrip patch 33 of a microstrip structure 30 are 1.1 mm×0.8 mm. A distance from an upper surface of the main ridge structure 26 to the patch of the microstrip structure 30 is 0.218 mm. A distance from the upper surface of the boundary ridge structure 24 to the microstrip structure 30 is 56 μm.

Figure 12:
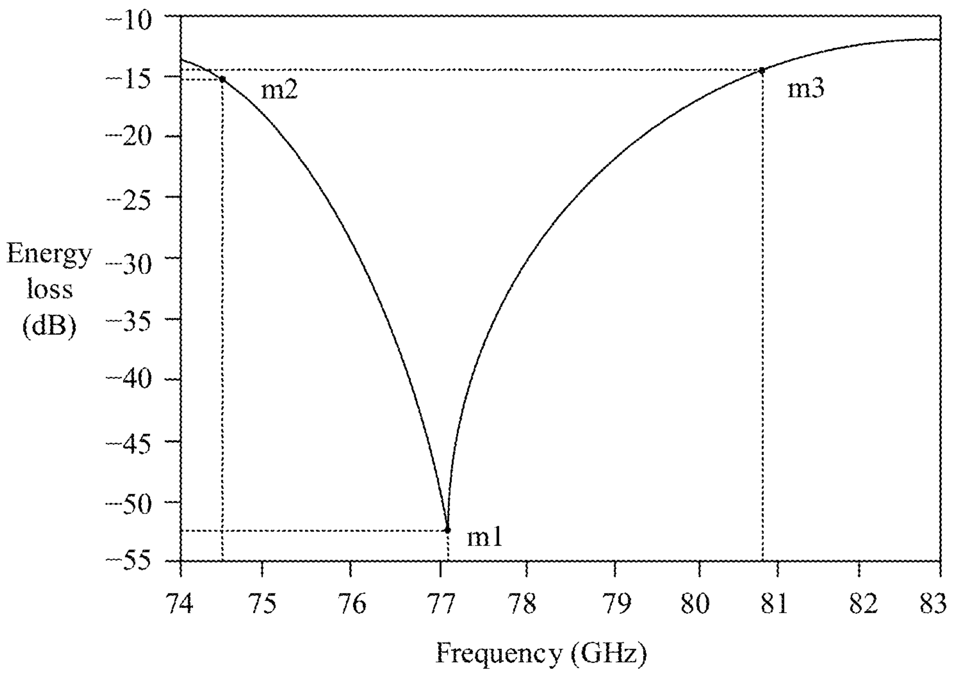
FIG. 12 is a schematic diagram of a test result of a return loss of a gap waveguide antenna structure according to an embodiment of this application.
Figure 13:
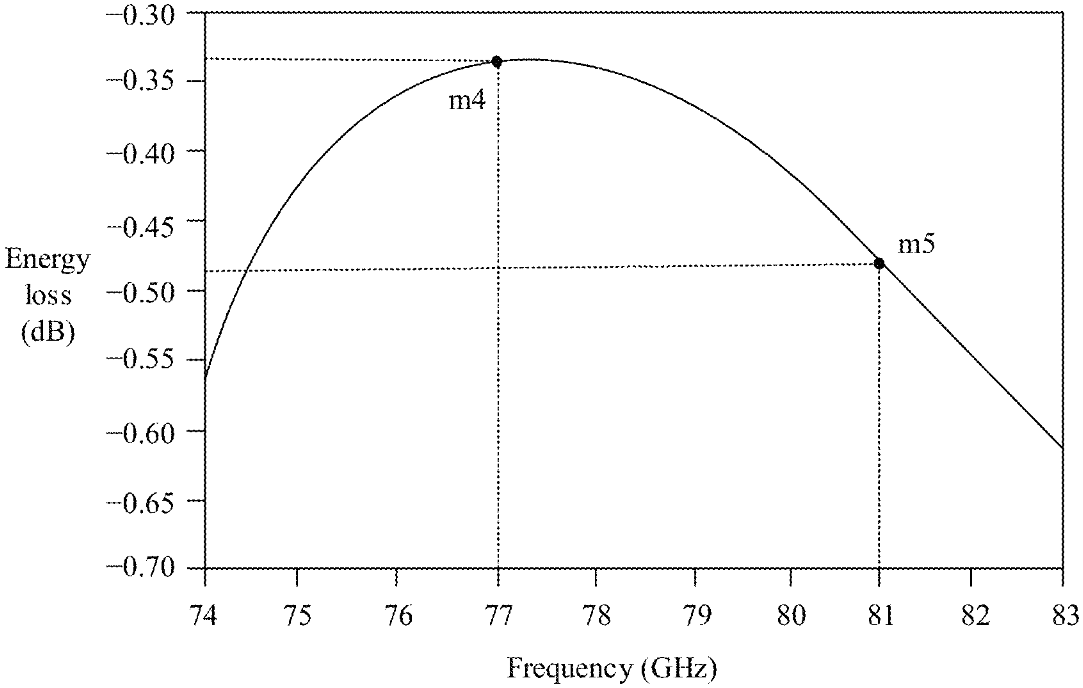
FIG. 13 is a schematic diagram of a test result of an insertion loss of a gap waveguide antenna structure according to an embodiment of this application.

An energy loss of the gap waveguide antenna structure in the foregoing example is tested, so that test results shown in FIG. 12 and FIG. 13 can be obtained. The test results are separately described below.

FIG. 12 is a schematic diagram of a test result of a return loss of a gap waveguide antenna structure according to an embodiment of this application. As shown in FIG. 12, a horizontal coordinate represents a frequency band, a vertical coordinate represents a baud rate of the return loss, and coordinates of m1, m2, and m3 are respectively m1 (77.1, −53.0), m2 (74.5, −15.2), and m3 (80.9, −14.6). It can be seen from FIG. 12 that return losses in a frequency band from 74.5 GHz to 81 GHz all fall within −15 dB; and a return loss is the lowest at 77.1 GHz, and is less than −50 dB.

FIG. 13 is a schematic diagram of a test result of an insertion loss of a gap waveguide antenna structure according to an embodiment of this application. As shown in FIG. 13, a horizontal coordinate represents a frequency band, a vertical coordinate represents a baud rate of the insertion loss, and coordinates of m4 and m5 are respectively m4 (77.0, −0.33) and m5 (81.0, −0.48). It can be seen from FIG. 13 that insertion losses in a frequency band from 74.5 GHz to 81 GHz all fall within a range of −0.33 dB to −0.48 dB, that is, a highest insertion loss is −0.33 dB at m4, and insertion losses of other frequencies are all lower than a value of the insertion loss at m4.

It can be seen from both FIG. 12 and FIG. 13 that both the return loss and the insertion loss of the gap waveguide antenna structure in this embodiment of this application are low.

In this embodiment of this application, metal layers are mainly both laid on two sides of a dielectric layer, thereby effectively reducing losses of energy and an electromagnetic wave during transmission, specifically, reducing energy losses of the energy and the electromagnetic wave in a process of passing through the dielectric layer. In addition, in this case, there may be plenty of space, so that a component is disposed on the metal layer (to be specific, the foregoing second metal layer) on a lower surface (a second side of the dielectric layer) of the dielectric, so that the gap waveguide antenna structure can be integrated with another component or another functional module, thereby facilitating use of the antenna structure in various practical scenarios, and expanding an application range of the antenna structure. In addition, a microstrip structure is further transformed into a microstrip structure having a structure form of a GCPW, so that an electromagnetic wave or energy can be more easily (better) transmitted to the microstrip structure 30, thereby further reducing losses of energy or an electromagnetic wave. In addition, a boundary ridge structure slightly higher than a ridge structure and/or slightly wider than the ridge structure is further disposed, so that a slot between the boundary ridge structure and the second metal layer becomes narrow and/or an area that may be used for coupling becomes large, thereby improving a coupling capability and further increasing transmission efficiency of energy or an electromagnetic wave.

Optionally, an embodiment of this application further provides an electronic device. The electronic device has the gap waveguide antenna structure in any one of the foregoing embodiments of this application.

Optionally, the electronic device may include a feeding unit and an antenna. The feeding unit is configured to provide an electromagnetic signal for the antenna, and the antenna may include any one of the gap waveguide antenna structures in the embodiments of this application.

Optionally, the electronic device may be any type of terminal device that can transmit energy or an electromagnetic wave by using the antenna structure, such as a mobile phone, a tablet, a computer, a vehicle-mounted terminal, or a wearable device.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A gap waveguide antenna structure, comprising:

a top layer;

a gap waveguide structure;

a microstrip structure; and a bottom layer;

wherein:

the top layer is parallel to the bottom layer;

the top layer comprises a first metal layer, a dielectric layer, and a second metal layer, wherein the first metal layer is laid on a first side of the dielectric layer, and the second metal layer is laid on a second side of the dielectric layer;

the gap waveguide structure comprises a periodic pin structure and a ridge structure, wherein the periodic pin structure and the ridge structure are disposed on a side of the bottom layer close to the top layer, a slot is formed between the periodic pin structure and the second metal layer, and a slot is formed between the ridge structure and the second metal layer;

the periodic pin structure comprises a plurality of pins, and the plurality of pins are periodically arranged on two sides of the ridge structure;

the microstrip structure is disposed in the second metal layer, and the microstrip structure is parallel to the ridge structure;

a frame of the microstrip structure is separated from metal of the second metal layer by leaving a space; and the ridge structure comprises a boundary ridge structure and a main ridge structure, the boundary ridge structure is located at one end of the ridge structure, the boundary ridge structure is disposed on a side below the microstrip structure toward the bottom layer, and a slot is formed between a surface of the boundary ridge structure toward the top layer and the microstrip structure.

2. The antenna structure according to claim 1, wherein a plurality of via holes are provided around the microstrip structure and in the top layer, and the first metal layer communicates with the second metal layer through the plurality of via holes.

3. The antenna structure according to claim 1, wherein a height of the boundary ridge structure is greater than a height of the main ridge structure.

4. The antenna structure according to claim 1, wherein a width of the boundary ridge structure is greater than a width of the main ridge structure.

5. The antenna structure according to claim 1, wherein the microstrip structure comprises a microstrip and a microstrip patch, and the microstrip patch is configured to radiate energy or an electromagnetic wave.

6. The antenna structure according to claim 1, wherein the plurality of pins are cuboids or cylinders.

7. A radar, comprising:

a feeding structure; and an antenna, wherein the feeding structure is configured to provide an electromagnetic signal for the antenna, wherein the antenna comprises an antenna structure, wherein the antenna structure comprises a top layer, a gap waveguide structure, a microstrip structure, and a bottom layer;

wherein:

the top layer is parallel to the bottom layer;

the top layer comprises a first metal layer, a dielectric layer, and a second metal layer, the first metal layer is laid on a first side of the dielectric layer, and the second metal layer is laid on a second side of the dielectric layer;

the gap waveguide structure comprises a periodic pin structure and a ridge structure, the periodic pin structure and the ridge structure are disposed on a side of the bottom layer close to the top layer, a slot is formed between the periodic pin structure and the second metal layer, and a slot is formed between the ridge structure and the second metal layer;

the periodic pin structure comprises a plurality of pins, and the plurality of pins are periodically arranged on two sides of the ridge structure;

the microstrip structure is disposed in the second metal layer, and the microstrip structure is parallel to the ridge structure;

a frame of the microstrip structure is separated from metal of the second metal layer by leaving a space; and the ridge structure comprises a boundary ridge structure and a main ridge structure, the boundary ridge structure is located at one end of the ridge structure, the boundary ridge structure is disposed on a side below the microstrip structure toward the bottom layer, and a slot is formed between a surface of the boundary ridge structure toward the top layer and the microstrip structure.

8. The radar according to claim 7, wherein a plurality of via holes are provided around the microstrip structure and in the top layer, and the first metal layer communicates with the second metal layer through the plurality of via holes.

9. The radar according to claim 7, wherein a height of the boundary ridge structure is greater than a height of the main ridge structure.

10. The radar according to claim 7, wherein a width of the boundary ridge structure is greater than a width of the main ridge structure.

11. The radar according to claim 7, wherein the microstrip structure comprises a microstrip and a microstrip patch, and the microstrip patch is configured to radiate energy or an electromagnetic wave.

12. The radar according to claim 7, wherein the plurality of pins are cuboids or cylinders.

* * * * *